US012652305B2

(12) United States Patent
Sakae et al.

(10) Patent No.: US 12,652,305 B2
(45) Date of Patent: Jun. 9, 2026

(54) RISK INFORMATION OUTPUT DEVICE, INFORMATION OUTPUT SYSTEM, RISK INFORMATION OUTPUT METHOD, AND RECORDING MEDIUM

(71) Applicant: NEC Corporation, Tokyo (JP)

(72) Inventors: Yoshiaki Sakae, Tokyo (JP); Jun Nishioka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 58 days.

(21) Appl. No.: 18/699,341

(22) PCT Filed: Nov. 12, 2021

(86) PCT No.: PCT/JP2021/041668
§ 371 (c)(1),
(2) Date: Apr. 8, 2024

(87) PCT Pub. No.: WO2023/084723
PCT Pub. Date: May 19, 2023

(65) Prior Publication Data
US 2024/0414180 A1 Dec. 12, 2024

(51) Int. Cl.
*H04L 9/40* (2022.01)

(52) U.S. Cl.
CPC ...... *H04L 63/1425* (2013.01); *H04L 63/0876* (2013.01)

(58) Field of Classification Search
CPC .......................... H04L 63/1425; H04L 63/0876
See application file for complete search history.

(56) References Cited

U.S. PATENT DOCUMENTS

| 10,432,605 | B1 * | 10/2019 | Lester | H04L 63/08 |
| 2018/0199386 | A1 * | 7/2018 | Yuan | H04W 4/70 |
| 2020/0314134 | A1 * | 10/2020 | Izrael | G06F 21/554 |
| 2021/0344681 | A1 * | 11/2021 | Jarvis | G06F 21/577 |

FOREIGN PATENT DOCUMENTS

| JP | 2020-038439 A | 3/2020 |
| JP | 2020-113090 A | 7/2020 |

OTHER PUBLICATIONS

International Search Report for PCT Application No. PCT/JP2021/041668, mailed on Feb. 8, 2022.

(Continued)

*Primary Examiner* — Vance M Little
(74) *Attorney, Agent, or Firm* — Sughrue Mion, PLLC

(57) ABSTRACT

A risk information output device according to the present disclosure comprises: a risk information acquisition means for acquiring risk information extracted from log information on a network apparatus to be monitored; an apparatus information acquisition means for acquiring apparatus information for the network apparatus; an authenticity determining means for determining the authenticity of the network apparatus on the basis of the acquired apparatus information; a priority determining means for determining, on the basis of the determined authenticity determination result, the priority of outputting the risk information; and an output means for outputting the risk information on the basis of the determined priority.

10 Claims, 5 Drawing Sheets

(56)      References Cited

OTHER PUBLICATIONS

English translation of Written opinion for PCT Application No. PCT/JP2021/041668, mailed on Feb. 8, 2022.
Shunsuke Kokubo et al., Maintenance of a security level and realization of a PDCA cycle by IT of information security management. IPSJ SIG Technical Reports. Mar. 2, 2007, vol. 2007, No. 16, pp. 453-458 in particular, description related to "4.4 Evaluation model for security level".

\* cited by examiner

Fig.3

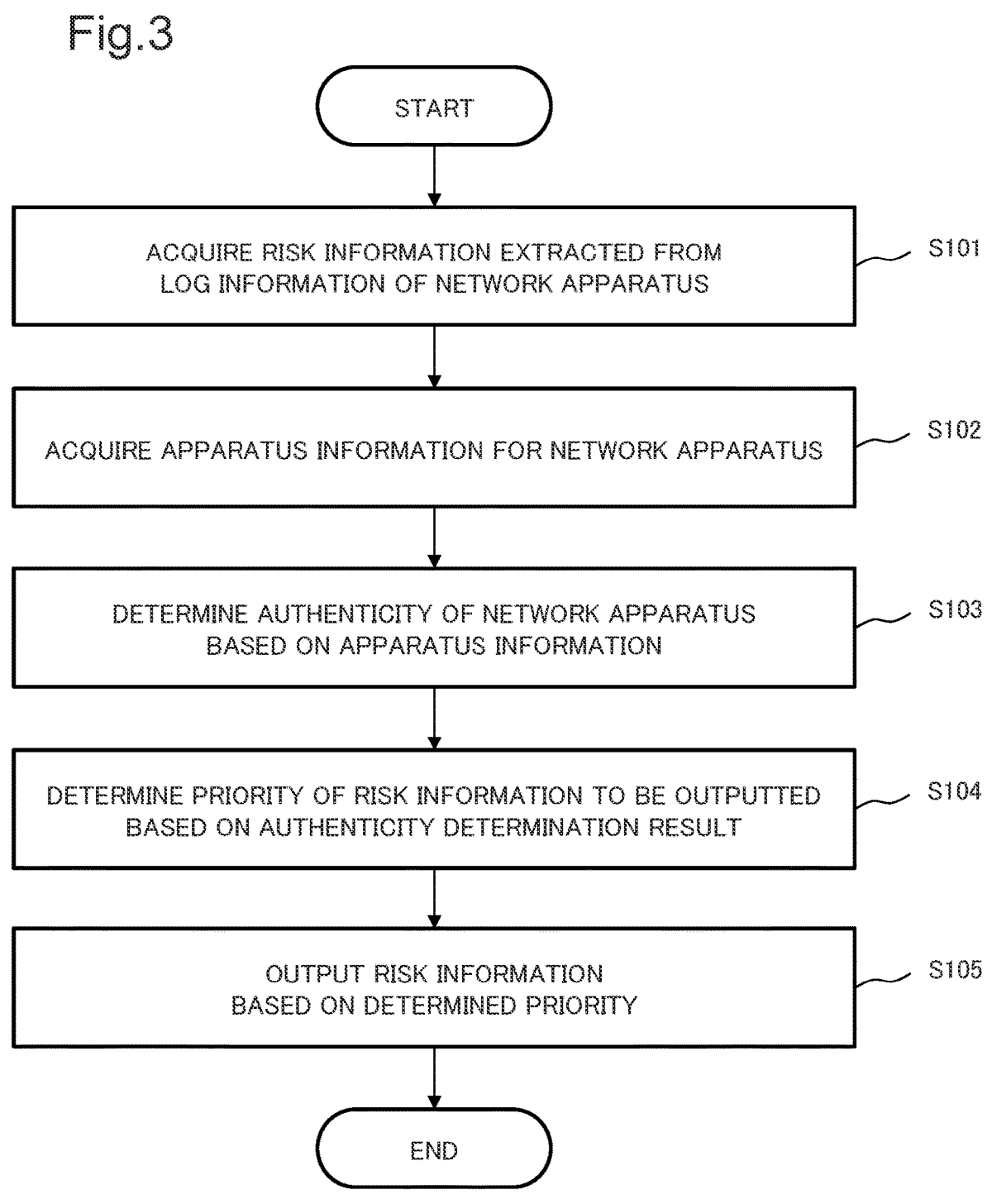

```
                    ┌─────────────┐
                    │    START    │
                    └──────┬──────┘
                           │
                           ▼
┌──────────────────────────────────────────────────┐
│         ACQUIRE RISK INFORMATION EXTRACTED FROM    │───  S101
│         LOG INFORMATION OF NETWORK APPARATUS       │
└──────────────────────────┬───────────────────────┘
                           │
                           ▼
┌──────────────────────────────────────────────────┐
│    ACQUIRE APPARATUS INFORMATION FOR NETWORK APPARATUS │───  S102
└──────────────────────────┬───────────────────────┘
                           │
                           ▼
┌──────────────────────────────────────────────────┐
│        DETERMINE AUTHENTICITY OF NETWORK APPARATUS │───  S103
│           BASED ON APPARATUS INFORMATION           │
└──────────────────────────┬───────────────────────┘
                           │
                           ▼
┌──────────────────────────────────────────────────┐
│  DETERMINE PRIORITY OF RISK INFORMATION TO BE OUTPUTTED │───  S104
│    BASED ON AUTHENTICITY DETERMINATION RESULT      │
└──────────────────────────┬───────────────────────┘
                           │
                           ▼
┌──────────────────────────────────────────────────┐
│             OUTPUT RISK INFORMATION                │───  S105
│           BASED ON DETERMINED PRIORITY             │
└──────────────────────────┬───────────────────────┘
                           │
                           ▼
                    ┌─────────────┐
                    │     END     │
                    └─────────────┘
```

Fig.5

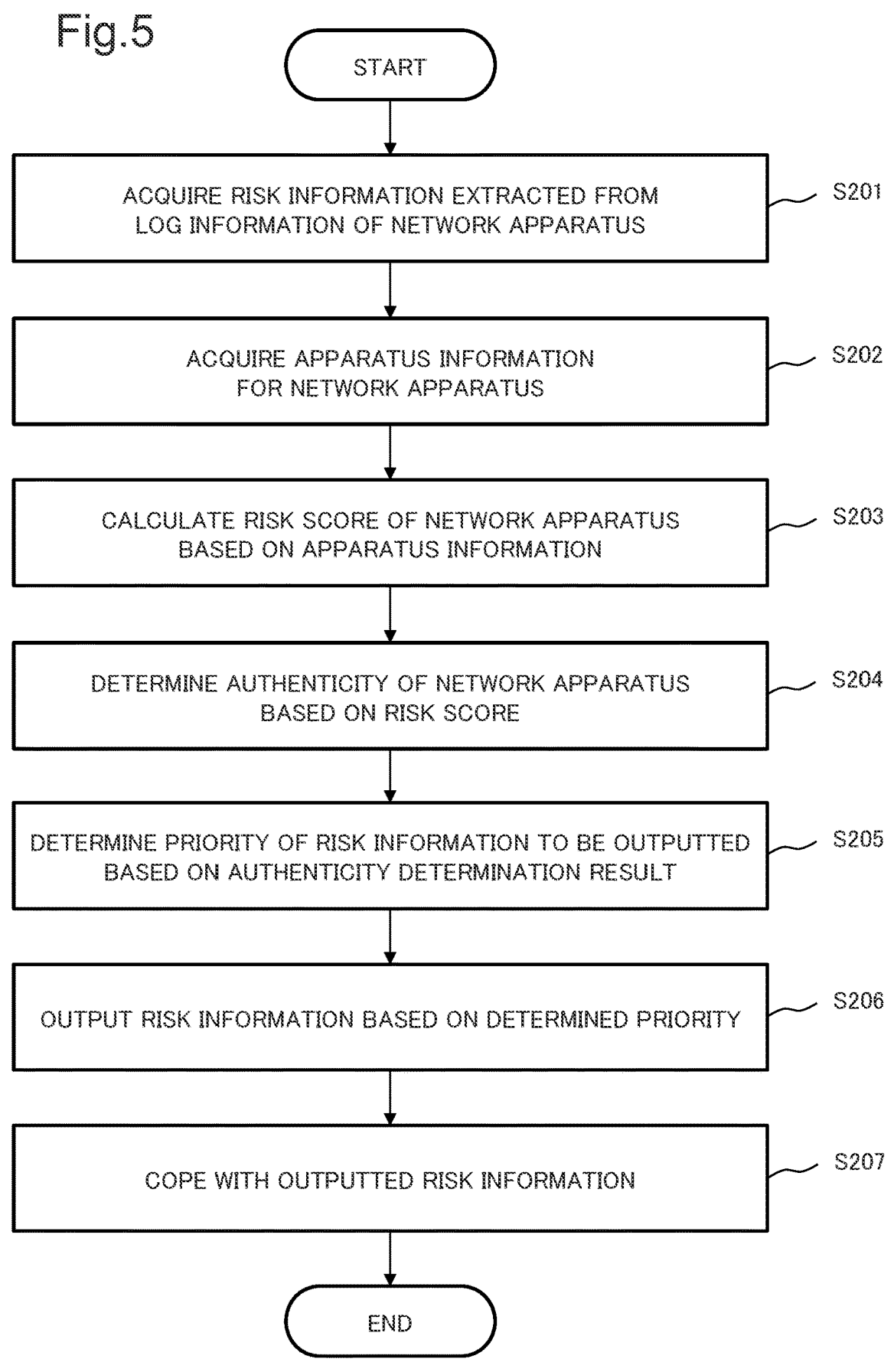

START

ACQUIRE RISK INFORMATION EXTRACTED FROM
LOG INFORMATION OF NETWORK APPARATUS — S201

ACQUIRE APPARATUS INFORMATION
FOR NETWORK APPARATUS — S202

CALCULATE RISK SCORE OF NETWORK APPARATUS
BASED ON APPARATUS INFORMATION — S203

DETERMINE AUTHENTICITY OF NETWORK APPARATUS
BASED ON RISK SCORE — S204

DETERMINE PRIORITY OF RISK INFORMATION TO BE OUTPUTTED
BASED ON AUTHENTICITY DETERMINATION RESULT — S205

OUTPUT RISK INFORMATION BASED ON DETERMINED PRIORITY — S206

COPE WITH OUTPUTTED RISK INFORMATION — S207

END

RISK INFORMATION OUTPUT DEVICE, INFORMATION OUTPUT SYSTEM, RISK INFORMATION OUTPUT METHOD, AND RECORDING MEDIUM

This application is a National Stage Entry of PCT/JP2021/041668 filed on Nov. 12, 2021, the contents of all of which are incorporated herein by reference, in their entirety.

TECHNICAL FIELD

The present disclosure relates to a risk information output device, an information output system, a risk information output method, and a recording medium.

BACKGROUND ART

During operation of a network apparatus, there are many logs of attacks from a plurality of apparatuses to be monitored, alerts of abnormality detection results, and the like, and there is a demand to narrow down notification alerts. In addition, there is a technology in which logs of abnormality detection are aggregated, and then logs that do not need to be coped with are scored and prioritized by rules based on knowledge.

For example, PTL 1 discloses a technique of determining the necessity of outputting a generated log using a list indicating that processing is abnormal, a list indicating that processing is normal, and the like, and outputting the log only when it is determined to output the log.

CITATION LIST

Patent Literature

PTL 1: JP 2020-038439 A

SUMMARY OF INVENTION

Technical Problem

However, in the invention described in PTL 1, a log to be outputted is determined based on a list. For this reason, it is difficult to accurately determine the necessity of output, for example, in a case where there is an omission in the list for determining the necessity of output.

An example of the object of the present disclosure is to provide a risk information output device capable of outputting risk information based on an appropriate priority.

Solution to Problem

A risk information output device according to an aspect of the present disclosure includes risk information acquisition means that acquires risk information extracted from log information of a network apparatus to be monitored, apparatus information acquisition means that acquires apparatus information visualizing a configuration and a risk regarding the network apparatus from an apparatus information storage device, authenticity determining means that determines authenticity of the network apparatus based on the acquired apparatus information, priority determining means that determines a priority of outputting the risk information based on a determined authenticity determination result, and output means that outputs the risk information based on the determined priority.

An information output system according to an aspect of the present disclosure includes a risk information storage device that stores risk information extracted from log information of a network apparatus to be monitored, an apparatus information storage device that stores apparatus information of the network apparatus, and a risk information output device that outputs risk information regarding an apparatus having authenticity in the risk information stored in the risk information storage device, and the risk information output device includes risk information acquisition means that acquires the risk information extracted from the log information of the network apparatus to be monitored, apparatus information acquisition means that acquires the apparatus information visualizing a configuration and a risk regarding the network apparatus from the apparatus information storage device, authenticity determining means that determines authenticity of the network apparatus based on the acquired apparatus information, priority determining means that determines a priority of outputting the risk information based on a determined authenticity determination result, and output means that outputs risk information based on the determined priority.

A risk information output method according to an aspect of the present disclosure includes acquiring risk information extracted from log information of a network apparatus to be monitored, acquiring apparatus information visualizing a configuration and a risk regarding the network apparatus, determining authenticity of the network apparatus based on the acquired apparatus information, determining a priority of outputting the risk information based on a determined authenticity determination result, and outputting the risk information based on the determined priority.

A recording medium according to an aspect of the present disclosure stores a program for causing a computer to execute acquiring risk information extracted from log information of a network apparatus to be monitored, acquiring apparatus information visualizing a configuration and a risk regarding the network apparatus, determining authenticity of the network apparatus based on the acquired apparatus information, determining a priority of outputting the risk information based on a determined authentication determination result, and outputting the risk information based on the determined priority.

Advantageous Effects of Invention

An example of an effect of the present disclosure is to provide a risk information output device capable of outputting risk information based on an appropriate priority.

BRIEF DESCRIPTION OF DRAWINGS

FIG. 3 is a flowchart illustrating risk information output according to the first example embodiment.

FIG. 5 is a flowchart illustrating an operation of risk information output according to the second example embodiment.

EXAMPLE EMBODIMENT

Next, example embodiments will be described in detail with reference to the drawings.

First Example Embodiment

A risk information output device 100 according to the first example embodiment is, for example, a device that incorporates a network apparatus having configuration information equal to configuration information of an external company into its own system and outputs risk information including a detected security threat or vulnerability to the network apparatus. An information output system 10 according to the present example embodiment includes the risk information output device 100, a risk information storage device 200 that stores risk information extracted from log information of a network apparatus to be monitored for the risk information output device 100, and an apparatus information storage device 300 that stores apparatus information visualizing a configuration and a risk regarding the network apparatus monitored by the risk information output device 100.

The risk information storage device 200 is implemented by, for example, security information and event management (SIEM). The apparatus information storage device 300 stores configuration information, event information, and inspection information of the network apparatus as the apparatus information. The apparatus information is appropriately updated from development of a system incorporating a network apparatus through addition of a function to the system, introduction of the system, and actual operation of the system, and the apparatus information stored in the apparatus information storage device 300 is also updated accordingly.

Figure 1:
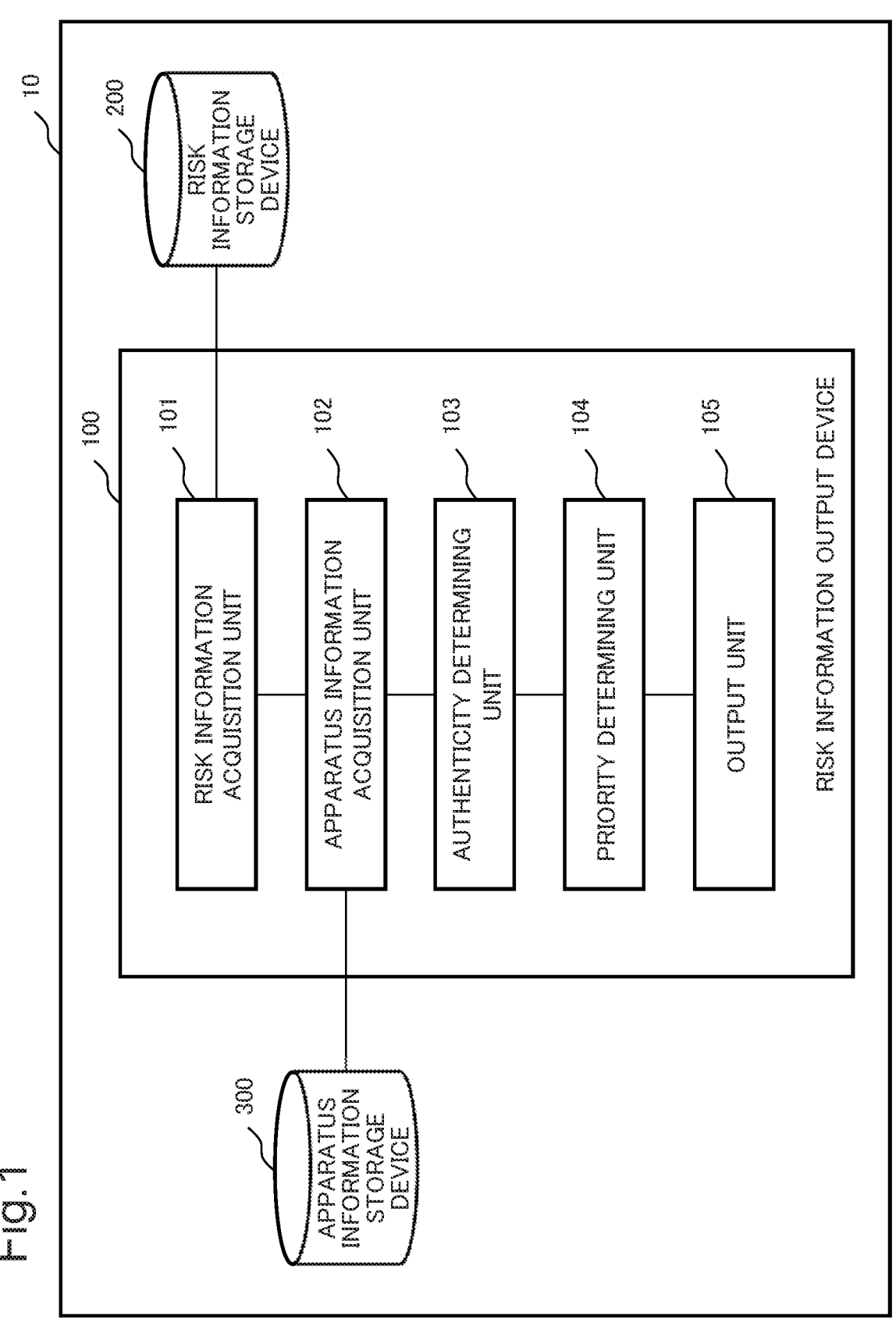
FIG. 1 is a block diagram illustrating a configuration of a risk information output device according to a first example embodiment.

FIG. 1 is a block diagram illustrating a configuration of the risk information output device 100 according to the first example embodiment. Referring to FIG. 1, the risk information output device 100 includes a risk information acquisition unit 101, an apparatus information acquisition unit 102, an authenticity determining unit 103, a priority determining unit 104, and an output unit 105. Hereinafter, the risk information output device 100 that is an essential configuration of the present example embodiment will be described in detail.

Figure 2:
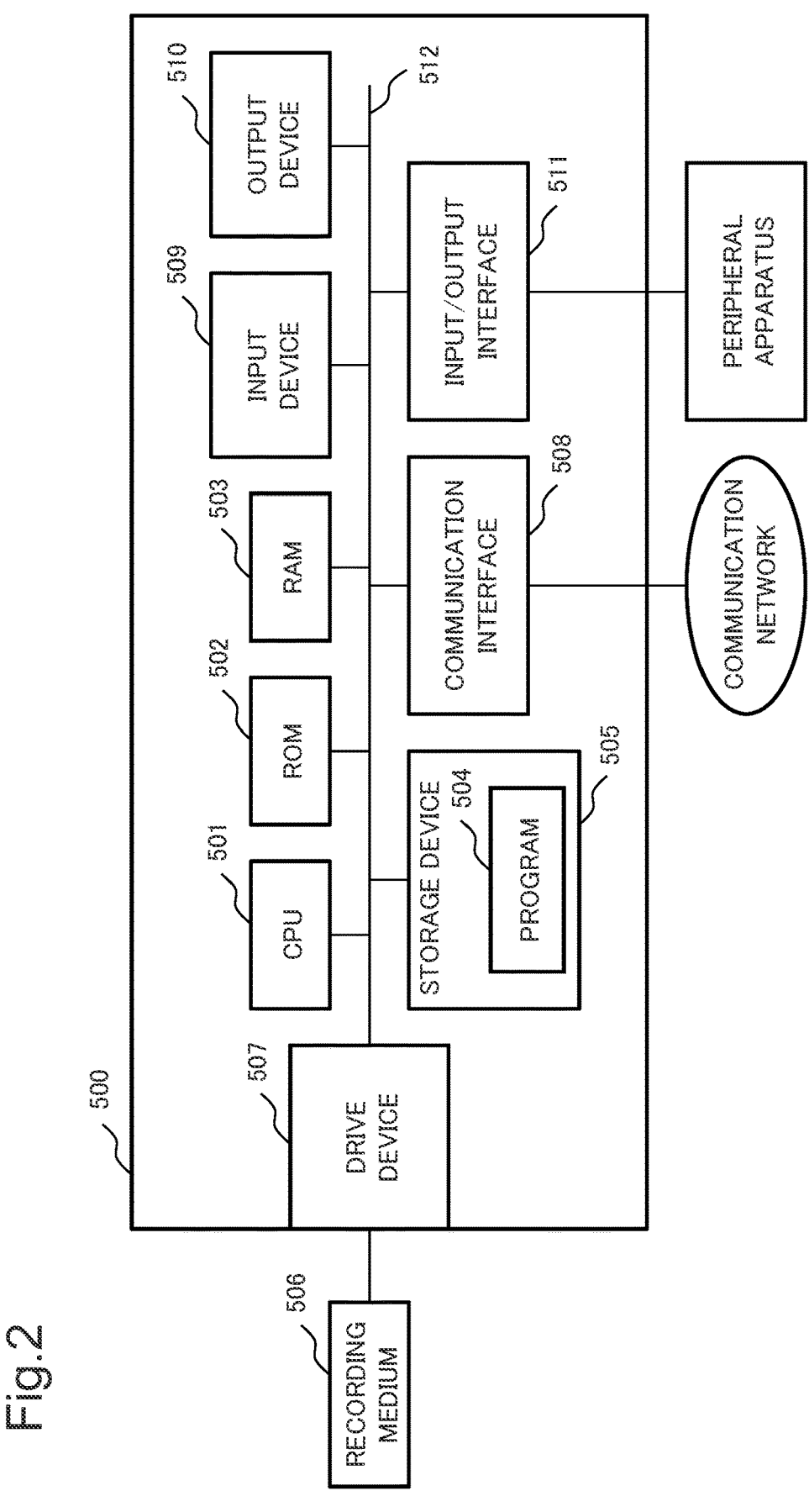
FIG. 2 is a diagram illustrating a hardware configuration in which the risk information output device according to the first example embodiment is implemented by a computer device and a peripheral device thereof.

FIG. 2 is a diagram illustrating an example of a hardware configuration in which the risk information output device 100 according to the first example embodiment of the present disclosure is implemented by a computer device 500 including a processor. As illustrated in FIG. 2, the risk information output device 100 includes memories such as a central processing unit (CPU) 501, a read only memory (ROM) 502, and a random access memory (RAM) 503, a storage device 505 such as a hard disk that stores a program 504, a communication interface (I/F) 508 for network connection, and an input/output interface 511 that inputs and outputs data. In the first example embodiment, the risk information acquired by the risk information acquisition unit 101 and the apparatus information acquired by the apparatus information acquisition unit 102 are inputted to the risk information output device 100 via the input/output interface 511, for example.

The CPU 501 operates an operating system to control the entire risk information output device 100 according to the first example embodiment of the present invention. Moreover, the CPU 501 reads a program and data from a recording medium 506 mounted on, for example, a drive device 507 to memories. Moreover, the CPU 501 functions as the risk information acquisition unit 101, the apparatus information acquisition unit 102, the authenticity determining unit 103, the priority determining unit 104, the output unit 105, and a part thereof in the first example embodiment, and executes processing or commands in the flowchart illustrated in FIG. 3 to be described later based on a program.

The recording medium 506 is, for example, an optical disk, a flexible disk, a magneto-optical disk, an external hard disk, a semiconductor memory, or the like. Some recording media in a storage device are non-volatile storage devices where a program is recorded. The program may be downloaded from an external computer (not illustrated) connected with a communication network.

An input device 509 is implemented by, for example, a mouse, a keyboard, a built-in key button, or the like, and is used for an input operation. The input device 509 is not limited to a mouse, a keyboard, or a built-in key button, and may be, for example, a touch panel. An output device 510 is implemented by, for example, a display, and is used to confirm an output.

As described above, the first example embodiment illustrated in FIG. 1 is implemented by the computer hardware illustrated in FIG. 2. However, means for implementing each unit included in the risk information output device 100 in FIG. 1 is not limited to the above-described configuration. Moreover, the risk information output device 100 may be implemented by one physically coupled device, or may be implemented by a plurality of devices in which two or more physically separated devices are connected in a wired or wireless manner. For example, the input device 509 and the output device 510 may be connected with the computer device 500 via a network. Moreover, the risk information output device 100 according to the first example embodiment illustrated in FIG. 1 may be implemented by cloud computing or the like.

In FIG. 1, the risk information acquisition unit 101 is means that acquires risk information extracted from log information of a network apparatus to be monitored. The network apparatus to be monitored may be singular or plural. Risk information is information including a security threat or vulnerability to a network apparatus to be monitored. The risk information acquisition unit 101 receives risk information from the risk information storage device 200 including SIEM, for example. A method of extracting risk information by SIEM can be performed by general software or the like. Examples of a method of extracting risk information by SIEM include the following. That is, SIEM collects log information from a plurality of systems by collecting log information of a network apparatus and normalizing the collected log information. Then, SIEM eliminates duplicate information from the collected log information, and compiles the same log information. Furthermore, SIEM performs correlation analysis of a plurality of pieces of log information, extracts risk information in combination with other pieces of log information even if only one piece of log information is considered valid, and stores the extracted risk information.

The apparatus information acquisition unit 102 is means that acquires apparatus information visualizing a configuration and a risk regarding a network apparatus. The apparatus information is information necessary for determining authenticity of the network apparatus, and includes different types of information such as configuration information, event information, and inspection information. The event information and the inspection information are information visualizing the risk of the network apparatus. The apparatus information acquisition unit 102 acquires the apparatus information of the network apparatus to be monitored from the apparatus information storage device 300. Here, each of apparatus information stored in the apparatus information storage device 300 will be described. In the apparatus information storage device 300, for example, the configuration information, the event information, and the inspection information are stored for each network apparatus together with a time when the information is acquired.

The configuration information is, for example, hardware information and software information of the network apparatus. The hardware information is manufacturer information, model numbers of chips, substrates, ports, or the like constituting hardware, identifiers assigned to hardware, or the like. The software information is manufacturer information, an operating system (OS) that processes hardware, a software name of a library, an application, or the like, version information of the software, a hash value, or the like. The hash value is a value calculated from data including software binaries and the like, and it is possible to confirm identity with software distributed from a software manufacturer by comparing the hash value with a hash value distributed from the manufacturer. The configuration information is updated at a timing when the configuration information such as a software version upgrade timing is updated.

The event information is, for example, log information generated in the network apparatus. As the log information, for example, packet communication information such as a communication data amount, a communication error rate, or the number of times of packet retransmission of each network port connected with the network apparatus is stored. The event information is updated at intervals of several seconds, for example.

The inspection information is information regarding a result of inspection analysis based on configuration information and event information of an apparatus to be monitored. In the inspection result, the result of the presence or absence of authenticity of the apparatus is stored in association with time information. The inspection information is updated, for example, at each timing when a configuration such as version upgrade of the software of the network apparatus is changed or at each timing when the event information greatly changes.

The authenticity determining unit 103 is means that determines the authenticity of the network apparatus based on the apparatus information acquired by the apparatus information acquisition unit 102. In the present example embodiment, authenticity is a state in which settings of hardware information and software information, and the like of a network apparatus are not erased, falsified, replaced, or the like. The authenticity determining unit 103 first determines the authenticity of the network apparatus for each of the configuration information, the event information, and the inspection information by a known method, and outputs authenticity individual information.

Regarding the configuration information, for example, the authenticity determining unit 103 determines whether there is authenticity based on a difference between the configuration information at the time when the system is delivered and the configuration information stored in the apparatus information storage device 300. Regarding the event information, for example, the authenticity determining unit 103 determines whether the apparatus has authenticity based on the obtained event information. Regarding the inspection information, for example, the apparatus information acquisition unit 102 determines whether there is authenticity based on an analysis result of the inspection and whether an inspection has been performed.

Next, the authenticity determining unit 103 comprehensively determines the authenticity of the network apparatus based on the authenticity individual information that is the authenticity determination result of each of the configuration information, the event information, and the inspection information. The authenticity determining unit 103 outputs the authenticity information as an authenticity determination result. The authenticity information is information indicating whether authenticity is secured, and may be indicated by a binary of presence or absence of authenticity. Alternatively, the authenticity information may be indicated by a numerical value (score) such as 0 to 100%.

For example, in a case where the authenticity information is indicated by presence or absence of authenticity, the authenticity determining unit 103 determines that the network apparatus has authenticity when all of the configuration information, the event information, and the inspection information of the network apparatus have authenticity. In a case where none of the information in the apparatus information of the network apparatus has authenticity, the authenticity determining unit 103 determines that the network apparatus does not have authenticity. In a case where the apparatus information of the network apparatus includes both of information with authenticity and information without authenticity, the authenticity determining unit 103 determines that there is authenticity in accordance with the number of pieces of information determined to have authenticity and the type of information determined to have authenticity. For example, in a case where it is determined that the configuration information does not have authenticity while it is determined that the event information and the inspection information have authenticity, the authenticity determining unit 103 determines that there is authenticity. However, the method of determining authenticity by the authenticity determining unit 103 is not limited to the above method.

The priority determining unit 104 is means that determines the priority of the risk information to be outputted based on the apparatus authenticity determination result determined by the authenticity determining unit 103. For example, in a case where the authenticity determining unit 103 determines that there is authenticity, the priority determining unit 104 lowers the priority of the risk information related to the network apparatus. On the other hand, in a case where the authenticity determining unit 103 determines that there is no authenticity, the priority determining unit 104 raises the priority of the risk information related to the network apparatus.

The output unit 105 is means that outputs risk information based on the priority determined by the priority determining unit 104. The output unit 105 outputs the risk information in a reference or order according to the priority. For example, the output unit 105 may output only the risk information regarding the network apparatus determined not to have authenticity by the authenticity determining unit 103. The output unit 105 may display the risk information by the output device 510 or may present the risk information by voice.

The operation of the risk information output device 100 configured as described above will be described with reference to the flowchart of FIG. 3.

FIG. 3 is a flowchart illustrating an outline of the operation of the risk information output device 100 according to the first example embodiment. Note that the processing in this flowchart may be executed based on program control by the processor described above.

As illustrated in FIG. 3, the risk information acquisition unit 101 first acquires risk information extracted from log information of the network apparatus to be monitored (step S101). Next, the apparatus information acquisition unit 102 acquires apparatus information for the network apparatus (step S102). Next, the authenticity determining unit 103 determines the authenticity of the network apparatus based on the apparatus information acquired by the apparatus information acquisition unit 102 (step S103). Next, the priority determining unit 104 determines the priority of the risk information to be outputted based on the authenticity determination result determined by the authenticity determining unit 103 (step S104). Finally, the output unit 105 outputs the risk information based on the priority determined by the priority determining unit 104 (step S104). Then, the risk information output device 100 terminates the operation of outputting risk information.

In the risk information output device 100 according to the present example embodiment, the priority determining unit 104 determines the priority of the risk information to be outputted based on the authenticity determination result of the network apparatus. As a result, since the risk information output device 100 preferentially outputs risk information related to an apparatus whose authenticity is not secured, the risk information can be outputted based on an appropriate priority.

A variation of the present example embodiment will be described. In the present example embodiment, the authenticity determining unit 103 first determines the authenticity of the network apparatus for each of the configuration information, the event information, and the inspection information by a known method, and comprehensively determines the authenticity of the network apparatus based on the authenticity individual information that is each authenticity determination result. However, the authenticity determining unit 103 may acquire each piece of authenticity individual information determined by the network apparatus based on various types of apparatus information, and determine the authenticity of the network apparatus based on the acquired authenticity individual information.

Second Example Embodiment

Next, a second example embodiment of the present disclosure will be described in detail with reference to the drawings. Hereinafter, description of contents overlapping with the above description will be omitted within a range where the description of the present example embodiment does not become unclear. Similarly to the computer device illustrated in FIG. 2, the function of each component in each example embodiment of the present disclosure can be implemented not only by hardware but also by a computer device or software based on program control.

Figure 4:
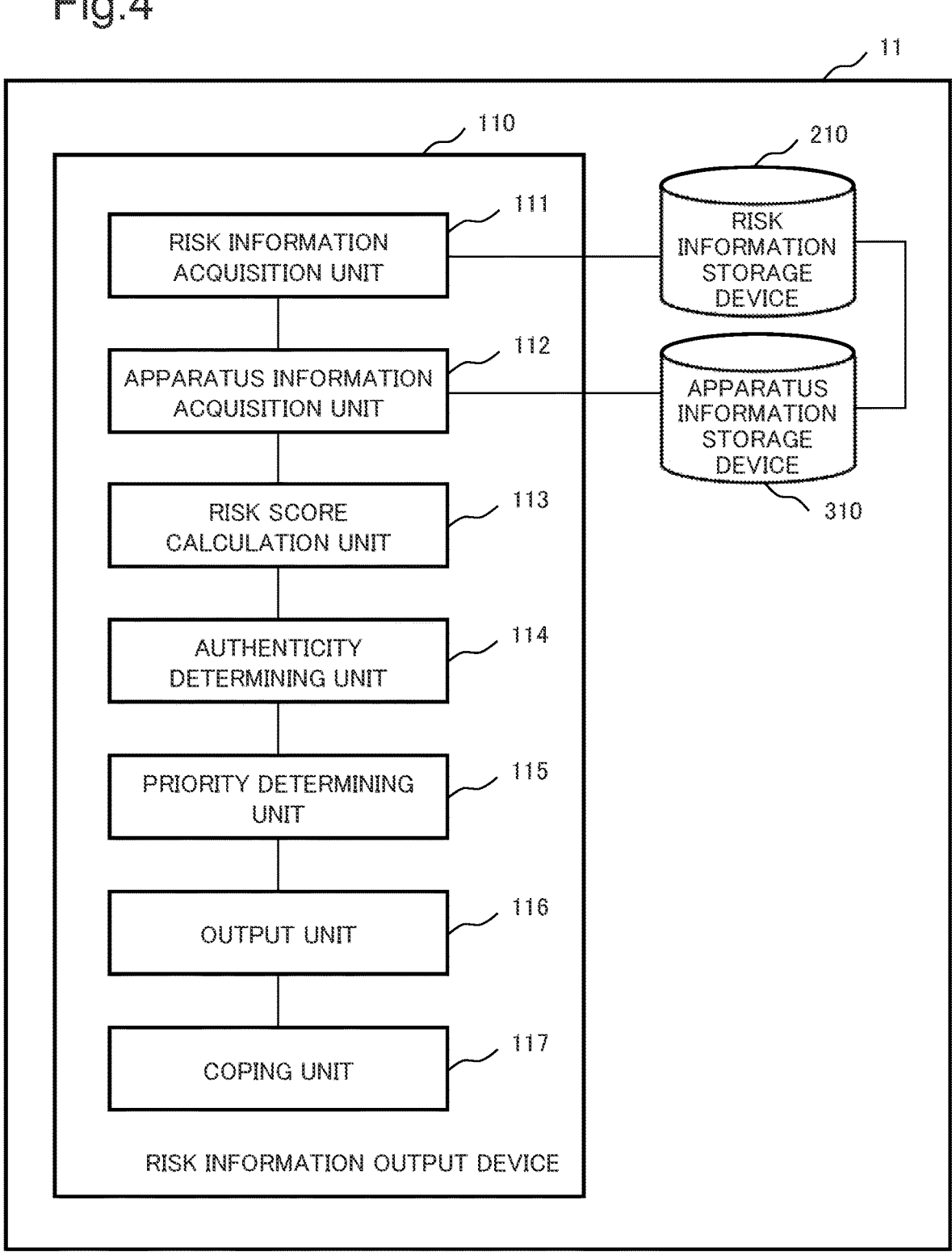
FIG. 4 is a block diagram illustrating a configuration of a risk information output device according to a second example embodiment.

FIG. 4 is a block diagram illustrating a configuration of a risk information output device 110 according to the second example embodiment of the present disclosure. Referring to FIG. 4, the risk information output device 110 according to the second example embodiment will be described focusing on parts different from those of the risk information output device 100 according to the first example embodiment. The risk information output device 110 according to the second example embodiment includes a risk information acquisition unit 111, an apparatus information acquisition unit 112, a risk score calculation unit 113, an authenticity determining unit 114, a priority determining unit 115, an output unit 116, and a coping unit 117. That is, the present example embodiment is different from the first example embodiment in including the risk score calculation unit 113 and the coping unit 117.

An information output system 11 according to the present example embodiment is different from that of the first example embodiment in that apparatus information stored in an apparatus information storage device 310 is stored in association with log information in a risk information storage device 210. Since the risk information acquisition unit 111 is similar to the risk information acquisition unit 101 according to the first example embodiment, the description thereof is omitted here.

The apparatus information acquisition unit 112 acquires apparatus information from the apparatus information storage device 310 based on identifier information of the log information. The identifier information is information that can specify log information such as a process name, a process ID (PID), a file descriptor (FD), a sequence number, or a time of the log information acquired by SIEM. The apparatus information acquisition unit 112 accepts the input of the identifier information from the input device 509 to specify the log information, and acquires the apparatus information of the network apparatus related to the log information from the apparatus information storage device 310. The apparatus information acquisition unit 112 outputs the acquired apparatus information to the risk score calculation unit 113.

The risk score calculation unit 113 is means that calculates a risk score of an apparatus that is a degree of authenticity based on the apparatus information. The risk score calculation unit 113 calculates a risk score based on various types of information including configuration information, event information, and inspection information of the network apparatus. First, the risk score calculation unit 113 scores the authenticity of various types of apparatus information by a known method based on the apparatus information acquired by the apparatus information acquisition unit 112. Specifically, regarding the configuration information, the risk score calculation unit 113 increases the score in a case where the configuration information is close to the configuration information at the time of delivery, and decreases the score as the number of different parts increases. The risk score calculation unit 113 may score the configuration information of the software by comparing the configuration information with the configuration information at the time of update instead of the configuration information at the time of delivery. That is, the score is increased in a case where the configuration information is close to the configuration information of the software at the time of update, and the score is decreased as the number of different parts increases. Moreover, the risk score calculation unit 113 increases the score in a case where the event information is close to the normal value, and decreases the score as a different part becomes larger. The risk score calculation unit 113 scores the inspection information according to the inspection result.

The risk score calculation unit 113 scores authenticity based on each authenticity information of the configuration information, the event information, and the inspection information by the above-described method. Next, the risk score calculation unit 113 calculates a risk score of the entire network apparatus by adding numerical values of various types of authenticity information associated with the target apparatus using a method such as logical sum, arithmetic average, or sum. However, the method of calculating the risk score by the risk score calculation unit 113 is not limited to the above method. Moreover, the risk score may be calculated using an artificial intelligence (AI) model generated based on a correlation between various types of authenticity information and an actual authenticity result. The risk score calculation unit 113 outputs the risk score of the apparatus calculated in this manner to the authenticity determining unit 114.

The authenticity determining unit 114 determines the authenticity of the network apparatus based on the risk score calculated by the risk score calculation unit 113. In a case where the calculated risk score is larger than a predetermined threshold, the authenticity determining unit 114 determines that there is authenticity. On the other hand, in a case where the calculated risk score is not larger than the predetermined threshold, the authenticity determining unit 114 determines that there is no authenticity. The threshold information is stored in the storage device 505, for example. The authenticity determining unit 114 outputs the authenticity determination result to the priority determining unit 115.

The priority determining unit 115 determines the risk information to be outputted based on the authenticity determination result determined by the authenticity determining unit 114. For example, the priority determining unit 115 determines to output the risk information related to the network apparatus determined to have no authenticity by the authenticity determining unit 114. On the other hand, the priority determining unit 115 determines not to output the risk information related to the network apparatus determined to have authenticity by the authenticity determining unit 114.

The output unit 116 outputs the risk information based on the priority determined by the priority determining unit 115. The output unit 116 causes the output device 510 to output the risk information in a reference or order according to the determined priority.

The coping unit 117 is means that copes with the risk information outputted by the output unit 116. The coping unit 117 copes with an apparatus related to the risk information outputted from the output unit 116 in accordance with the risk information. As the coping method, for example, a coping method learned based on a past case is stored in the storage device 505. For example, the coping unit 117 changes the configuration of the network apparatus based on the risk information in such a way as not to generate a risk. Moreover, the coping unit 117 may analyze the cause of occurrence of the risk. In the apparatus information storage device 300, the apparatus information is accumulated and stored together with a time when the apparatus information is acquired. For example, in a case where risk information is outputted to a network apparatus to be monitored by the output unit 116, the coping unit 117 causes the apparatus information acquisition unit 112 to acquire apparatus information of a peripheral apparatus connected with the network apparatus. For example, the coping unit 117 analyzes the acquired apparatus information of the peripheral apparatus, and in a case where a change in the configuration information is detected within a certain period (within several days), it is estimated that the cause is a configuration change of the peripheral apparatus. Moreover, the coping unit 117 may acquire apparatus information of a specific period necessary for risk cause analysis. This enables risk history analysis.

The operation of the risk information output device 110 configured as described above will be described with reference to the flowchart of FIG. 5.

FIG. 5 is a flowchart illustrating an outline of the operation of the risk information output device 110 according to the second example embodiment. Note that the processing in this flowchart may be executed based on program control by the processor described above.

As illustrated in FIG. 5, the risk information acquisition unit 111 first acquires risk information extracted from log information of an apparatus to be monitored (step S201). Next, the apparatus information acquisition unit 112 acquires apparatus information for the network apparatus (step S202). Next, the risk score calculation unit 113 calculates a risk score of the network apparatus based on the apparatus information acquired by the apparatus information acquisition unit 112 (step S203). Next, the authenticity determining unit 114 determines the authenticity of the network apparatus based on the calculated risk score (step S204). Next, the priority determining unit 115 determines the priority of the risk information to be outputted based on the authenticity result determined by the authenticity determining unit 114 (step S204). Next, the output unit 116 outputs the risk information based on the priority determined by the priority determining unit 115 (step S205). Finally, the coping unit 117 copes with the risk information outputted by the output unit 116 (step S206). Then, the risk information output device 110 terminates the operation of outputting the risk information.

In the second example embodiment of the present disclosure, the authenticity determining unit 114 determines the authenticity of the network apparatus based on the calculated risk score, and the priority determining unit 115 determines the priority of the risk information to be outputted based on the determined authenticity result. As a result, since the priority of the risk information to be outputted can be set finely, the risk information can be outputted based on a more appropriate priority. In the second example embodiment of the present disclosure, the coping unit 117 copes with the risk information outputted by the output unit 116. This enables to prevent security damage from spreading to the network apparatus. In particular, since the apparatus information acquired by the apparatus information acquisition unit 112 is continuously updated and includes time information, history analysis for the risk information is possible.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, although a plurality of operations is described in order in a flowchart form, the order of description does not limit the order of executing the plurality of operations. Therefore, when each example embodiment is implemented, the order of the plurality of operations can be changed within a range that does not interfere in content. Moreover, in the present example embodiment, the priority determining unit 115 determines to output the risk information related to the apparatus determined not to have authenticity, and determines not to output the risk information related to the apparatus determined to have authenticity. However, the priority determining unit 115 may determine to output the risk information in order of the score of the risk score calculated by the risk score calculation unit 113. That is, the authenticity determining unit 114 may not be provided in the second example embodiment. Moreover, although the risk score calculation unit 113 scores the authenticity of various types of apparatus information based on the apparatus information, information (authenticity individual information) in which the authenticity of various types of apparatus information is scored may be acquired from the network apparatus.

| Reference Signs List | |
|---|---|
| 10, 11 | information output system |
| 100, 110 | risk information output device |
| 101, 111 | risk information acquisition unit |
| 102, 112 | apparatus information acquisition unit |
| 103, 114 | authenticity determining unit |
| 104, 115 | priority determining unit |
| 105, 116 | output unit |
| 113 | risk score calculation unit |
| 117 | coping unit |
| 200 | risk information storage device |
| 300 | apparatus information storage device |

What is claimed is:

1. A risk information output device comprising:
a memory storing instructions; and
at least one processor configured to execute the instructions to:
acquire risk information extracted from log information of a network apparatus to be monitored;
acquire apparatus information visualizing a configuration and a risk regarding the network apparatus;
determine authenticity of the network apparatus based on the acquired apparatus information;
determine a priority of outputting the risk information based on a determined authenticity determination result of the network apparatus, wherein the determining the priority comprises:
lowering the priority in a case in which the determined authenticity determination result indicates that the network apparatus is authentic, and
rising the priority in a case in which the determined authenticity determination result indicates that the network apparatus is not authentic; and
output the risk information based on the determined priority.

2. The risk information output device according to claim 1, wherein the apparatus information includes configuration information, event information, and inspection information of the network apparatus.

3. The risk information output device according to claim 2, wherein the at least one processor is further configured to execute the instructions to:
acquire authenticity individual information for each of the configuration information, the event information, and the inspection information,
wherein the authenticity of the network apparatus is determined based on the acquired authenticity individual information for each of the configuration information, the event information, and the inspection information.

4. The risk information output device according to claim 1, wherein the at least one processor is further configured to execute the instructions to:
acquire a risk score that is a degree of authenticity,
wherein the authenticity of the network apparatus is determined based on the acquired risk score.

5. The risk information output device according to claim 1, wherein the at least one processor is further configured to execute the instructions to:
cope with an apparatus related to the outputted risk information.

6. An information output system including:
a risk information storage device configured to store risk information extracted from log information of a network apparatus to be monitored;
an apparatus information storage device configured to store apparatus information visualizing a configuration and a risk regarding the network apparatus; and
a risk information output device configured to output risk information based on an authenticity determination result of the network apparatus, wherein the risk information is stored in the risk information storage device,
wherein the risk information output device comprising:
a memory storing instructions; and
at least one processor configured to execute the instructions to:
acquire risk information extracted from log information of a network apparatus to be monitored;
acquire the apparatus information from the apparatus information storage device;
determine authenticity of the network apparatus based on the acquired apparatus information;
determine a priority of outputting the risk information based on a determined authenticity determination result of the network apparatus,
wherein the priority is lowered in a case in which the determined authenticity determination result indicating that the network apparatus is authentic, and
the priority is raised in a case in which the determined authenticity determination result indicating that the network apparatus is not authentic; and
output the risk information based on the determined priority.

7. The information output system according to claim 6, wherein the apparatus information includes configuration information, event information, and inspection information of the network apparatus.

8. The information output system according to claim 6, wherein the apparatus information stored in the apparatus information storage device is stored in association with the log information in the risk information storage device, and the at least one processor is further configured to execute the instructions to:
acquire the apparatus information from the apparatus information storage device based on identifier information of the log information.

9. A risk information output method comprising:
acquiring risk information extracted from log information of a network apparatus to be monitored;
acquiring apparatus information visualizing a configuration and a risk regarding the network apparatus;
determining authenticity of the network apparatus based on the acquired apparatus information;
determining a priority of outputting the risk information based on a determined authenticity determination result,
wherein the priority is lowered in a case in which the determined authenticity determination result indicating that the network apparatus is authentic, and
the priority is raised in a case in which the determined authenticity determination result indicating that the network apparatus is not authentic; and
outputting the risk information based on the determined priority.

10. A non-transitory computer readable recording medium storing a program for causing a computer to execute:
acquiring risk information extracted from log information of a network apparatus to be monitored;

acquiring apparatus information visualizing a configuration and a risk regarding the network apparatus;

determining authenticity of the network apparatus based on the acquired apparatus information;

determining a priority of outputting the risk information based on a determined authenticity determination result, wherein the priority is lowered in a case in which the determined authenticity determination result indicating that the network apparatus is authentic, and the priority is raised in a case in which the determined authenticity determination result indicating that the network apparatus is not authentic; and outputting the risk information based on the determined priority.

\* \* \* \* \*